United States Patent [19]
Gaillard et al.

[11] Patent Number: 6,021,810
[45] Date of Patent: Feb. 8, 2000

[54] INLET CHECK VALVE

[75] Inventors: Michael E. Gaillard; Steve W. Balls, both of Joplin, Mo.

[73] Assignee: Waterjet Service, Inc., Joplin, Mo.

[21] Appl. No.: 09/312,138

[22] Filed: May 14, 1999

Related U.S. Application Data

[63] Continuation-in-part of application No. 08/971,027, Nov. 14, 1997, Pat. No. 5,904,179.

[51] Int. Cl.[7] ........................................... F16K 15/00
[52] U.S. Cl. ..................... 137/533; 137/512; 137/533.11; 137/567
[58] Field of Search ..................... 132/533, 512, 132/533.11, 417, 567, 571, 534

[56] References Cited

U.S. PATENT DOCUMENTS

| | | |
|---|---|---|
| 625,114 | 5/1899 | MacSpadden . |
| 1,116,467 | 11/1914 | Myers ................. 137/533.11 |
| 1,165,100 | 12/1915 | Holland . |
| 1,539,127 | 5/1925 | Lipman . |
| 1,608,424 | 11/1926 | Putnam . |
| 1,700,234 | 1/1929 | McCrosky ............ 137/533.11 |
| 1,785,313 | 12/1930 | Keener . |
| 1,796,455 | 3/1931 | Gunn et al. ........... 137/533.13 |
| 2,001,885 | 5/1935 | Ohmart . |
| 2,043,849 | 6/1936 | Bixler . |
| 2,048,943 | 7/1936 | Munn . |
| 2,061,480 | 11/1936 | Pigott ................. 137/533.21 |
| 2,118,356 | 5/1938 | Money . |
| 2,143,399 | 1/1939 | Abercrombie . |
| 2,217,380 | 10/1940 | Pedder et al. . |
| 2,264,136 | 11/1941 | Karlberg . |
| 2,268,119 | 12/1941 | Honstetter et al. . |
| 2,296,135 | 9/1942 | Batson et al. . |
| 2,353,161 | 7/1944 | Heigis et al. . |
| 2,725,183 | 11/1955 | Hanson . |
| 2,996,155 | 8/1961 | Priesemuth . |
| 3,060,961 | 10/1962 | Conley . |
| 3,106,169 | 10/1963 | Prosser et al. . |
| 3,123,867 | 3/1964 | Combs . |
| 3,260,217 | 7/1966 | Thresher . |
| 3,309,013 | 3/1967 | Bauer . |
| 3,309,014 | 3/1967 | Bauer et al. . |
| 3,503,079 | 3/1970 | Smith . |
| 3,526,246 | 9/1970 | Leitgeb . |
| 3,544,065 | 12/1970 | Mercier . |
| 3,659,967 | 5/1972 | McArthur et al. . |
| 3,765,306 | 10/1973 | Luft . |
| 4,026,322 | 5/1977 | Thomas . |
| 4,098,085 | 7/1978 | McDowell . |
| 4,371,001 | 2/1983 | Olsen . |
| 4,501,292 | 2/1985 | Maloblocki ......................... 137/533.11 |
| 4,624,176 | 11/1986 | Steinke ............................. 137/533.11 |
| 5,037,277 | 8/1991 | Tan . |
| 5,226,799 | 7/1993 | Raghavan et al. . |
| 5,337,561 | 8/1994 | Raghavan et al. . |
| 5,381,631 | 1/1995 | Raghavan et al. . |
| 5,564,469 | 10/1996 | Tremoulet, Jr. et al. . |
| 5,709,242 | 1/1998 | Bergen ............................... 137/533.11 |

*Primary Examiner*—Denise L. Ferensic
*Assistant Examiner*—Joanne Y. Kim
*Attorney, Agent, or Firm*—Wood, Herron & Evans, L.L.P.

[57] ABSTRACT

A check valve assembly mounted on an end surface of a projection of a valve body. The check valve assembly includes a valve having a curved sealing surface disposed adjacent a fluid inlet intersecting the end surface of the projection. The check valve assembly further includes a rigid mounting plate having a cavity that receives and maintains the valve between the cavity and the fluid inlet. The curved surface of the valve partially extends into the fluid inlet and has a circular line of contact against the end surface of the projection around the fluid inlet to define a closed valve position. The valve is positioned away from the closed valve position to define an open valve position.

23 Claims, 1 Drawing Sheet

INLET CHECK VALVE

This application is a continuation-in-part application of U.S. Ser. No. 08/971,027, entitled "Inlet Check Valve", filed Nov. 14, 1997 now U.S. Pat. No. 5,904,179, issued on May 18, 1999.

FIELD OF THE INVENTION

This invention relates generally to the field of check valves and, more particularly, to an improved check valve for use with a high pressure hydraulic cylinder.

BACKGROUND OF THE INVENTION

An inlet check valve for use with high pressure cylinders, for example, up to 40,000 psi or greater, must be capable of operating reliably at such high pressures. One example of an inlet check valve assembly is described in U.S. Pat. No. 4,371,001 which discloses an inlet valve mounted on the end of a projecting portion of a generally cylindrical check valve body. The inlet check valve has a valve element that is mounted over an inlet passage. The inlet valve element tapers from a lower larger diameter to a thin shaft that is pressed into an opening on one end of a leaf spring. The opposite end of the leaf spring is secured to the projection of the valve body by a mounting screw extending through a spacer into a threaded hole in the valve body. The spacer has a height equal to the height of the valve element such that the leaf spring is approximately perpendicular to the center lines of the mounting screw and the valve element. Such a check valve normally functions well in service, however, the design does have several disadvantages. First, the leaf spring is capable of rotation with respect to its mounting screw. Therefore, the valve element may be installed off-center with respect to the inlet passage, or the valve element may be moved off-center during operation of the cylinder pump. When the valve is off-center and misaligned with the inlet passage, the valve element is subjected to uneven wear and overheating. In addition, the leaf spring can bend or otherwise inhibit the valve from having the proper lift, thereby potentially causing overheating and reducing pump efficiency. Further, the assembly of the valve element and leaf spring must be replaced whenever the valve element itself must be replaced, thereby increasing the cost of valve replacement. Consequently, there is the need for an improved inlet check valve.

SUMMARY OF THE INVENTION

The present invention provides an inlet check valve with a mounting plate that is more reliable, stable and faster in its operation and is more easily assembled and economically replaced. Further, the inlet check valve of the present invention operates to reliably charge an associated reciprocating pump without malfunctioning and overheating. In addition, its faster operation reduces hydraulic pressure spikes in the system from the reciprocating pump.

In accordance with the principles of the present invention and in accordance with the described embodiments, the present invention provides a check valve assembly mounted on an end surface of a projection from a valve body. The check valve assembly includes a valve having a sealing surface disposed adjacent a fluid inlet intersecting the end surface of the projection. The check valve assembly further includes a rigid mounting plate having a cavity that receives and maintains the valve between the cavity and the fluid inlet. The surface of the valve partially extends into the fluid inlet and has a circular line of contact against the end surface of the projection around the fluid inlet to define a closed valve position blocking liquid flow through the inlet. The surface of the valve is positioned away from the closed valve position to define an open valve position permitting liquid flow through the inlet.

In one aspect of the invention, the valve has a curved surface; and in a further aspect of the invention the curved surface is spherical.

These and other objects and advantages of the present invention will become more readily apparent during the following detailed description together with the drawings herein.

DETAILED DESCRIPTION OF THE INVENTION

Figure 1:
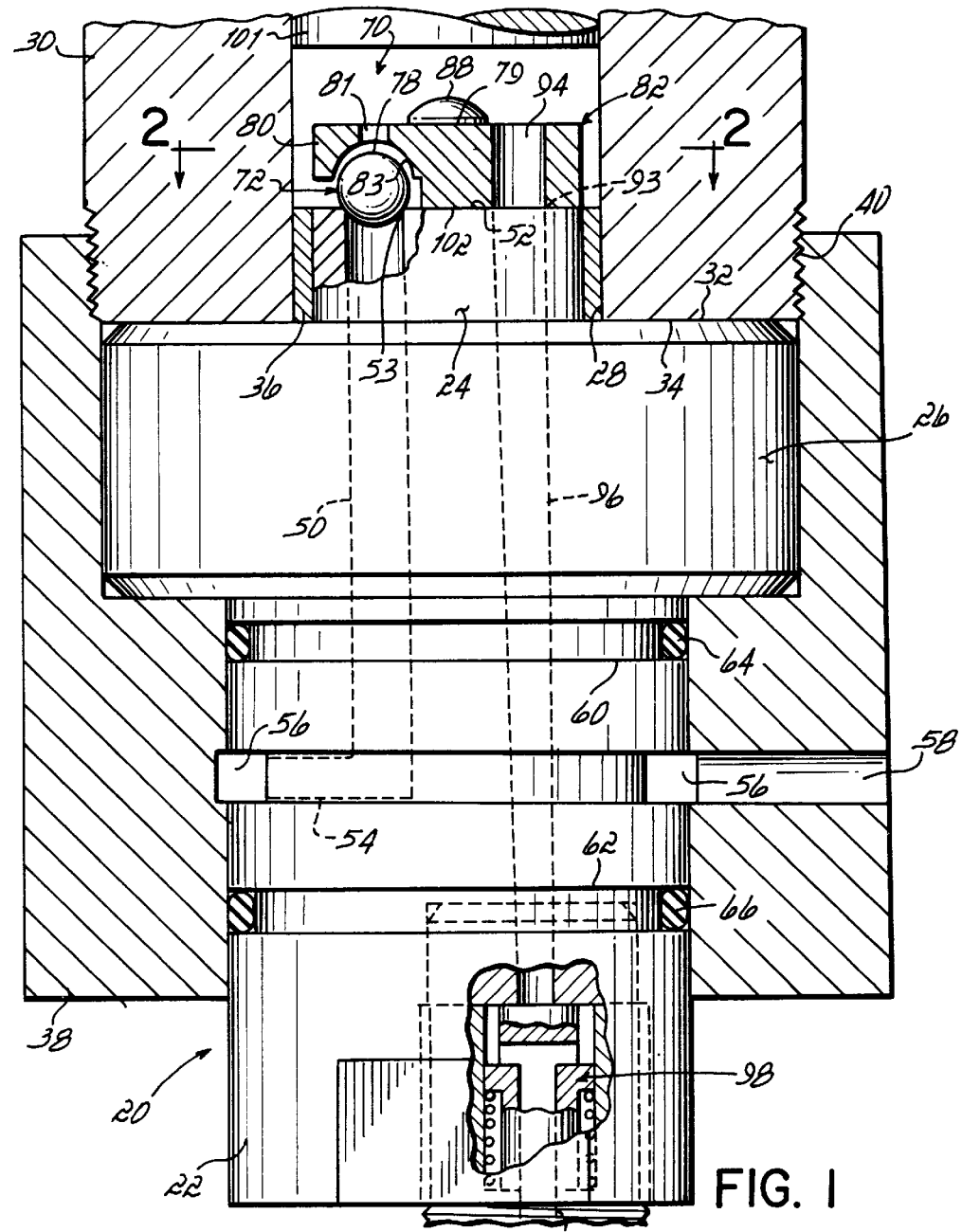
FIG. 1 is a side elevation view partially in cross-section of a check valve body illustrating a valve element of the inlet check valve in its closed position in accordance with the principles of the present invention.

Referring to FIG. 1, a check valve assembly 20 of the present invention includes a generally cylindrical check valve body 22. The check valve body 22 has a centrally located cylindrical projection 24 that extends beyond a larger diameter flange 26 into the bore 28 of a high pressure hydraulic cylinder or pump 30. The flange 26 has an annular surface 32 that bears against an end surface 34 of the cylinder 30. An annular seal 36 fills the gap between the outer surface of the projection 24 and the inner surface of the bore 28. The check valve body 22 is secured to the end of a high pressure hydraulic cylinder 30 by means of an end cap 38 screwed onto the threaded end 40 of the cylinder 30.

The check valve body 22 has an off-center low pressure fluid inlet passage 50 with one end intersecting a seating or end surface 52 on the end of the projection 24 to form a fluid inlet orifice 53. The other end of the passage 50 intersects a radial passage 54. The radial passage 54 intersects an annular groove 56 that, in turn, is aligned with a radial passage 58 within the end cap nut 38. The radial passage 58 is connected to a source of low pressure fluid (not shown). The valve body 22 further includes annular grooves 60, 62 that receive O-rings 64, 66 for providing a fluid-tight seal between the valve body 22 and the end cap 38.

Figure 2:
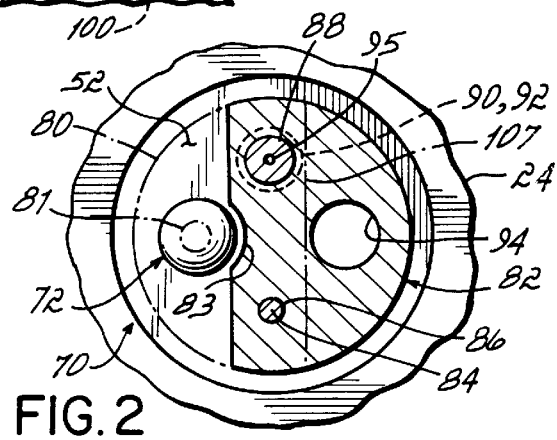
FIG. 2 is cross-sectional top view of the inlet check valve taken generally along line 2—2 of FIG. 1.

Referring to FIGS. 1 and 2, an inlet check valve 70 is mounted on the end surface 52 of the projection 24. The inlet check valve 70 includes a valve 72 preferably having an outer surface with a curved or spherical shape and cross-sectional profile. The valve 72 is preferably a ball disposed above the inlet 53 within a cavity 83 of a mounting plate 82. The mounting plate 82 has an upper side or surface 79 with an arcuate and preferably circular periphery extending parallel to the surface 52 of the projection 24. A portion of the upper side 79 forms a flange 80, and an opening or hole 81 is located in the flange 80.

A cavity 83 is located below the flange 80 between the upper side 79 and a lower surface 102 of the mounting plate 82. The cavity 83 has a curved and preferably spherical shape and cross-sectional profile. Thus, the valve 72 is able to move freely in the cavity 83 and in a direction generally parallel to a centerline of the valve body 22; and the lift of the valve 72 is fixed by the height of the cavity 83 above the end surface 52 and the size of the valve 72, for example, the diameter of the valve 72. The hole 81 is radially displaced from the centerline of the valve body 22 and is concentric with the inlet fluid passage 50. The mounting plate 82 has a first locating element 84, for example, a locating hole, sized to receive a locating pin 86 fixed into the surface 52 of the projection 24. The mounting plate 82 has a second locating element 90, for example, a second locating hole, which receives a fastener 88, for example, a screw. The screw 88 extends through the locating hole 90 and is screwed into a threaded hole 92 within the projection 24, thereby attaching the mounting plate to the end surface 52 of the projection 24. Normally, the screw 88 contains a center through-hole 95 that functions to equalize pressure within the threaded hole 92 during the fill and discharge strokes of the piston 101 within the cylinder 30. Thus, the mounting plate 82 is precisely positioned with respect to the end surface 52 of the projection 24 by the guide pin 86 and the screw 88. Consequently, the position of the valve 72 is fixed with respect to the inlet 53; and if through usage, screw 88 loosens, the locating pin 86 holds the mounting plate 82 in its desired position, thereby maintaining the valve 72 centrally over the inlet passage 50. The mounting plate 82 further includes an off-center fluid outlet bore 94 that is coextensive with an off-center fluid outlet passage 96 within the valve body 22. One end of the outlet passage 96 intersects the end surface 52 to form a fluid outlet 93, and the other end of the outlet passage 96 is fluidly connected to an outlet check valve 98 within the body 22. Fluid passing through the check valve 98 exits the valve body 22 through an outlet 100.

Figure 1A:
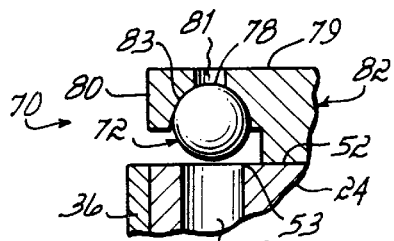
FIG. 1A is a partial side elevation view illustrating the valve element of the inlet check valve element in its open position.

In use, referring to FIG. 1, during an intake stroke, a piston 101 within the cylinder 30 moves away from the projection 24, thereby creating a pressure differential across the inlet check valve 70 such that the fluid in the inlet passages 50, 54, 56, 58 is under a relatively small positive pressure. That positive fluid pressure is applied against the outer surface of the valve 72 and pushes the valve 72 away from the end surface 52 of the projection 24 and the closed position illustrated in FIG. 1 to an open position as illustrated in FIG. 1A. When in the open position, fluid readily flows from the fluid source (not shown) through the passage 58 and the inlet fluid passages 50, 54, 56 in the valve body 22 to fill the bore 28 of the cylinder 30. When the piston 101 in the cylinder 30 reverses direction, a very high fluid pressure is applied via the opening 81 to an upper portion 78 of the outer surface (as viewed in FIG. 1) of the valve 72, thereby creating a pressure differential. That pressure differential pushes the valve 72 to a closed position in which the outer surface of the valve 72 partially extends past the end surface 52 and into the inlet orifice 53 on the projection 24, thereby sealing the inlet orifice 53 as illustrated in FIG. 1. In the sealing position, the valve 72 has an annular area, that is, a circular line, of bearing contact with an annular portion of the orifice 53. Thus, fluid is prevented from passing through the inlet 53 into the bore 50. The high pressure fluid then passes through the bore 94 in the mounting plate 82, through the outlet orifice 93, outlet passage 96, outlet check valve 98 and through the outlet 100 of the valve body 22. Thus, during the operation of the cylinder pump 30, it is believed that the valve 72 continuously rotates, to some extent, to provide a different outer surface area against the annular sealing area around the inlet 53. Therefore, the valve 72 wears evenly during use, is less subject to overheating and provides a highly repeatable fill cycle.

The operation of the valve described herein provides superior performance. It is believed that the curved shape of the outer surface of the valve provides less resistance in the closing process; and therefore, the valve described herein is more responsive and closes faster than other valves. Normally, the piston 101 is powered by a reciprocating pump which creates significant pressure spikes in reversing direction. An accumulator is used to absorb the changes in pressure, but the hydraulic system still experiences pressure spikes. The faster response of the valve described herein minimizes those pressure spikes and provides a generally improved and smoother operation. Further, the ball valve construction has a longer life, is less expensive to manufacture and easier to maintain in the field.

When it is desired to maintain or replace the valve 72, the end cap 38 is unscrewed from the end 40 of the cylinder 30; and the valve body 22 is removed from the end of the cylinder 30. Removing the screw 88 releases the mounting plate 82 and valve 72 from the projection 24. The valve 72 is removed, and a replacement valve is inserted therefor. The hole 84 in the mounting plate 82 is positioned over the locating pin 86, and the screw 88 is again inserted into the threaded hole 92. The curved or spherical shape of the outer surface of the valve 72 automatically aligns the valve 72 in its desired concentric position with respect to the inlet 53, and the screw 88 is tightened to bring the lower surface 102 of the mounting plate into bearing contact with the end surface 52 of the projection 24. Further, if the screw 88 is not fully tightened or loosens during operation, the valve 72 cannot move but maintains its desired concentric relationship with the inlet 53. Advantageously, the valve 72 is not permanently connected to any other component and therefore, can be replaced by itself, thereby minimizing the cost of replacement. Thus, the above design provides an inlet check valve that functions reliably throughout its normal operating life.

While the invention has been set forth by a description of the preferred embodiment in considerable detail, it is not intended to restrict or in any way limit the claims to such detail. Additional advantages and modifications will readily appear to those who are skilled in the art. For example, while the cavity 83 is shown as being a mating partial spherical shape, the cavity may be conical or any other shape that is effective to receive and maintain the valve in its desired operating position with respect to the inlet 53. Further, in the disclosed embodiment, the valve 72 is spherical; however, as will be appreciated, the valve can be any shape that can be held captured by the cavity 83 and provides a circular line of contact with the inlet 53 when the valve is in the closed position. For example, the valve could be conical in shape, have a bullet shape nose or be curved but not spherical. In addition, the orifice illustrated as being the opening 81 is shown as a single cylindrical hole; however, as will be appreciated, an opening or openings of any size, shape and number may be used to facilitate the application of a closing pressure force onto the valve 72.

As will be appreciated, the locations of the locating hole 84 and locating pin 86 may be reversed such that the locating hole extends through the surface 52 of the projection 24 and the locating pin is attached to the mounting plate 82. Further, in the disclosed embodiment, the major cross-sectional profile of the mounting plate 82, that is, the cross-sectional profile taken right below the upper surface 79, is generally arcuate and specifically circular. However, the mounting plate 82 may have a noncircular shape such that the major cross-sectional profile is octagonal, hexagonal or an irregular shape. Further, it is not required that the plate 82 cover the outlet 93. For example, a mounting plate 82 may be made that eliminates the portion of the mounting plate shown to the right of the phantom line 107 in FIG. 2.

In the described embodiment, the fastener 88 is screwed into a threaded hole 90 which is offset and displaced from the outlet passage 96. As will be appreciated, the end of the outlet passage 96 can be threaded and the screw 88 threaded into the outlet passage 96. In that embodiment, the outlet passage 96 becomes the second locating element, and hole 90 is not required. In addition, the screw 88 must have a bore extending longitudinally therethrough in order to carry fluid from the bore 28 of the cylinder 30 into the passage 96. Alternatively, the locating hole 84 and pin 86 may be eliminated, and a second locating element provide by a sleeve mounted in the bore 94 that is sized to extend into the outlet fluid passage 96. In a further alternative embodiment, the second locating element may be eliminated; and the mounting plate held in place by the torque applied to the screw 88.

Therefore, the invention in its broadest aspects is not limited to the specific detail shown and described. Consequently, departures may be made from the details described herein without departing from the spirit and scope of the claims which follow.

What is claimed is:

1. A check valve assembly mounted on an end surface of a projection extending from one end of a valve body, the valve body having a fluid inlet intersecting the end surface of the projection, the apparatus comprising:
    a valve having an exterior surface and disposed immediately adjacent the fluid inlet; and
    a rigid mounting plate mounted on the end surface of the projection and having
        a cavity for receiving and maintaining the valve between the cavity and the end surface of the projection, and
        a first locating element adapted to receive a fastener attaching the mounting plate to the end surface of the projection,
    the exterior surface of the valve extending into the fluid inlet and having a circular line of contact against the end surface of the projection around the fluid inlet to define a closed valve position blocking a flow of liquid through the fluid inlet,
    the exterior surface of the valve being positioned away from the closed valve position to define an open valve position permitting the flow of liquid through the fluid inlet.

2. A check valve assembly mounted on an end surface of a projection extending from one end of a valve body, the valve body having a fluid inlet intersecting the end surface of the projection, the apparatus comprising:
    a valve having a curved exterior surface and disposed immediately adjacent the fluid inlet; and
    a rigid mounting plate mounted on the end surface of the projection and having
        a cavity for receiving and maintaining the valve between the cavity and the end surface of the projection, and
        a first locating element adapted to receive a fastener attaching the mounting plate to the end surface of the projection,
    the curved exterior surface of the valve extending into the fluid inlet and bearing against the end surface of the projection around the fluid inlet to define a closed valve position blocking a flow of liquid through the fluid inlet,
    the curved exterior surface of the valve being positioned away from the closed valve position to define an open valve position permitting the flow of liquid through the fluid inlet.

3. A check valve assembly of claim 2 wherein the curved exterior surface of the valve is spherical.

4. A check valve assembly of claim 2 wherein the valve is a ball.

5. A check valve assembly of claim 4 wherein the cavity has a generally spherical shape.

6. The apparatus of claim 2 wherein the mounting plate has a lower side with an area adapted to contact the end surface of the projection.

7. The apparatus of claim 6 wherein the mounting plate has an opposite upper side and the cavity receiving the valve located below a portion of the upper side.

8. The apparatus of claim 7 wherein the upper side of the mounting plate forms a flange over the cavity, and the flange has a hole extending therethrough.

9. The apparatus of claim 2 wherein the mounting plate further has a second locating element adapted to locate the mounting plate with respect to the end surface on the projection.

10. The apparatus of claim 9 wherein the second locating element is a hole adapted to receive a locating pin attached to the end surface of the projection.

11. The apparatus of claim 9 wherein the second locating element is a pin adapted to extend into a hole in the end surface of the projection.

12. The apparatus of claim 9 wherein the valve body has a fluid outlet intersecting the end surface of the projection and the second locating element is a hole for receiving the fastener.

13. The apparatus of claim 12 wherein the hole for receiving the fastener is concentric with the fluid outlet in the end surface of the projection.

14. The apparatus of claim 12 wherein the hole for receiving the fastener is displaced from, and not concentric with, the fluid outlet in the end surface of the projection.

15. The apparatus of claim 14 wherein the mounting plate has an outlet opening positioned to be generally concentric with the outlet.

16. The apparatus of claim 2 wherein the mounting plate has a generally arcuate major cross-sectional profile.

17. The apparatus of claim 16 wherein of the mounting plate has a major cross-sectional profile having a generally circular shape.

18. The apparatus of claim 2 wherein the mounting plate has a major cross-sectional profile having a noncircular shape.

19. A check valve assembly mounted on an end surface of a projection extending from one end of a valve body, the valve body having a fluid inlet intersecting the end surface of the projection, the apparatus comprising:
    a valve having a spherical exterior surface and disposed immediately adjacent the fluid inlet; and
    a rigid mounting plate having
        a lower side with an area adapted to contact the end surface of the projection,
        an opposite upper side,
        a cavity located between portions of the upper and lower sides for receiving and maintaining the valve between the cavity and the end surface of the projection,
        a hole extending between the upper side and the cavity,
        a first locating element adapted to locate the mounting plate with respect to the end surface on the projection, and a second locating element adapted to receive a fastener attaching the mounting plate to the end surface of the projection, the spherical exterior surface of the valve partially extending into the fluid inlet and bearing against the end surface of the projection around the fluid inlet to define a closed valve position blocking a flow of liquid through the fluid inlet, and the spherical exterior surface of the valve being positioned away from the closed valve position to define an open valve position permitting the flow of liquid through the fluid inlet.

20. A check valve assembly of claim 19 wherein the valve is a ball.

21. A check valve assembly of claim 20 wherein the cavity has a generally partially spherical shape.

22. The check valve assembly of claim 19 wherein the mounting plate has a flange extending from one side of the mounting plate and over the cavity.

23. The check valve assembly of claim 22 wherein the clearance hole is located in the flange.

* * * * *